Aug. 18, 1936.    L. ZAIGER    2,051,668
WINDSHIELD WIPER BLADE
Filed Nov. 23, 1935
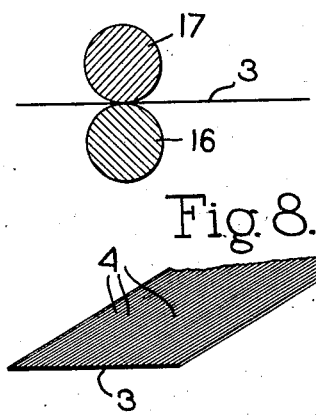
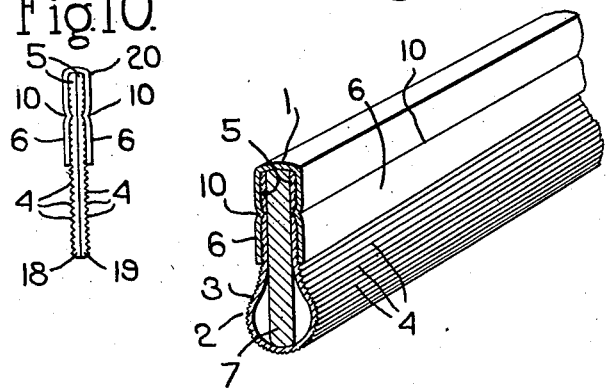
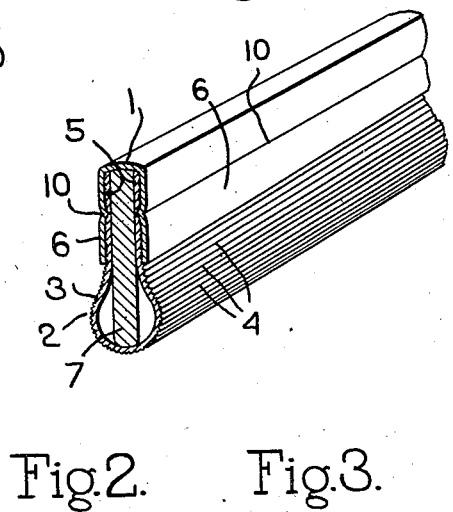
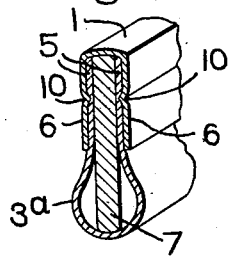
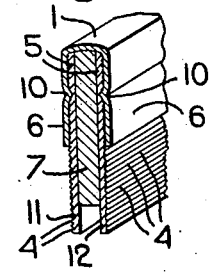
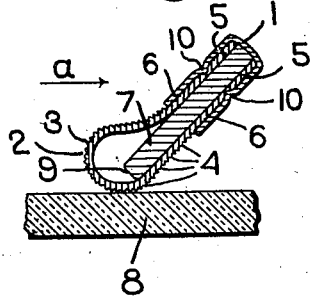
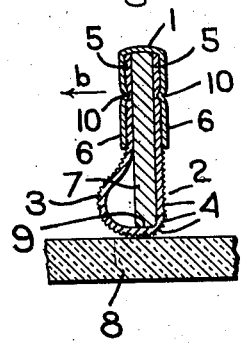
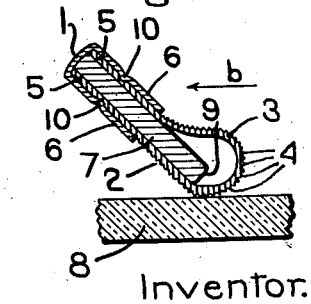
Inventor.
Louis Zaiger
by Heard Smith & Tennant.
Attys.

Patented Aug. 18, 1936

2,051,668

UNITED STATES PATENT OFFICE 2,051,668

WINDSHIELD WIPER BLADE

Louis Zaiger, Lynn, Mass.

Application November 23, 1935, Serial No. 51,239

3 Claims. (Cl. 15—245)

This invention relates to windshield wiper blades and it has for one of its objects to provide an improved blade which has superior cleaning qualities and also to provide a blade constructed to facilitate the flopping action of the blade when it reverses its direction of movement at each end of its stroke.

Windshield wiper blades are now commonly made with the wiping element in the form of a plurality of plies of thin flexible rubber retained in a metal holder or backing member. A wiping element of this construction is effective for keeping the windshield clean after it has been in operation a short time, but if at the time that the wiper is set in operation the windshield is covered with a coating of dust, as windshields usually are after a car has been driven some distance in dry weather, the first few strokes of the wiper blade produce a blurring film on the windshield which is difficult to see through. This is because the moisture which it is desired to clean from the windshield moistens the dust on the windshield and when the smooth surface of the wiper blade moves back and forth over the surface of the windshield having the moistened dust and road film thereon, it creates the blurring film on the windshield and frequently it is several minutes before the wiper blade has wiped this blurring film free from the windshield.

One of the objects of my invention is to provide an improved windshield wiper which will clean this blurring film from the windshield at the first stroke or two so that as soon as the wiper is set in operation it at once produces a clear vision through the portion of the windshield over which it operates regardless of the accumulation of dust and road film on the windshield prior to the time that the wiper is set in operation.

This end is accomplished by making the wiper blade with soft pliable wiping surfaces having very fine corrugations or ribs therein extending longitudinally thereof. The wiping element thus has the soft flexible character which is desirable in windshield wipers, and is also provided with a glass-engaging surface which frees the windshield quickly from road film. dust, etc. that causes the blurring film above referred to.

The flopping action of the wiper blade is facilitated by the use of the reenforcing member inserted between the two flexible finely corrugated plies which constitute the wiping surface, such reenforcing members serving to hold the flexible wiping element against the windshield glass and also providing a fulcrum edge on which the wiper blade turns during the flopping action.

In order to give an understanding of the invention I have illustrated in the drawing some selected embodiments thereof which will now be described after which the novel features will be pointed out in the appended claims.

In the drawing:

Fig. 1 is a sectional perspective view of a wiper blade embodying the invention.

Figs. 2, 3, and 4 are similar views showing different embodiments of the invention.

Figs. 5, 6, and 7 are views showing the manner in which the wiper blade shown in Fig. 1 operates in cleaning a windshield.

Fig. 8 shows the material of which the wiping surfaces of the wiper blade may be made.

Fig. 9 is a view illustrating one way of forming a thin flexible rubber sheet with the fine ribs.

Fig. 10 is a sectional view showing still another embodiment of the invention.

The wiper blade herein shown includes in its construction the usual U-shaped backing member or holder 1 of metal and a cleaning element 2 retained by the holder. The cleaning element 2 is formed of rubber as usual in windshield wiper blades, and in the preferred form of my invention the wiping element is made of a relatively thin flexible sheet or strip of rubber having relatively fine ribs formed on the glass-engaging faces thereof, the high flexibility of the wiping element together with the very finely corrugated surface producing a wiping element which removes dust and road film from the glass during the first stroke or two after the wiper is set in operation. In the embodiment of my invention shown in Figs. 1, 6, 7, and 8 the wiping element 2 is formed from a relatively thin strip 3 of soft flexible rubber which is provided on one face with relatively fine corrugations in the form of relatively small closely arranged parallel ribs 4 as shown in Fig. 8. This relatively thin flexible sheet or strip of rubber is folded into the U shape shown in Fig. 1 and the edges 5 thereof are received within the sides 6 of the U-shaped holder 1. Situated within the folded sheet 3 is a reenforcing member 7 herein shown in the form of a strip of some suitable material which is less flexible and yielding than the rubber sheet 3 of the wiping element 2. This reenforcing strip 7 is of a width to extend considerably beyond the edges of the legs 5 of the holder 1 and it will preferably have such a width that the U portion of the cleaning element 2 will normally engage the edge of the strip as shown in Fig. 1. The reenforcing strip 7 may be made of leather, leather board, fibre or rubber or any other suitable material, and, as stated above, it is constructed so that it is much less flexible than the relatively thin rubber sheet 3. The rubber sheet 3 is constructed to fit loosely about the portion of the reenforcing strip 7 that projects beyond the holder 1 so that when the U portion of the rubber sheet 3 rests against the edge of the reenforcing strip 7 the side portions of the sheet are spaced from the sides of the strip, as best shown in Figs. 1 and 2.

With this construction the entire wiping surface of the cleaning element is a finely corrugated surface having a high degree of flexibility, it being desirable that the corrugations or ribs 4 should be relatively fine so that a large number of them will be engaging the windshield simultaneously.

Figs. 5, 6, and 7 show the manner in which the blade of Fig. 1 functions. In Fig. 5 the wiper is shown as moving across the glass 8 of the windshield in the direction of the arrow a. During this movement the windshield blade is inclined to the glass and as it wipes over the face of the glass the relatively stiff reenforcing member 7 holds the thin flexible wiping element 3 against the glass, as shown in Fig. 5. The finely corrugated surface of the member 3 is exceedingly effective in cleaning the glass, and in rapidly removing dust, road film or other deposit on the glass which forms the basis of the blurring film that frequently is formed on the windshield when the wiper is first put into action. In fact, with my improved wiper having the soft flexible wiping surface provided with its fine corrugations, the first two or three strokes of the wiper blade will effectively remove the road film, dust or other deposit on the windshield which forms the basis of the blurring film that is produced by the ordinary windshield wiper when it is first started.

When the wiper arm of the wiper blade reaches the end of its stroke toward the right, Fig. 6, and reverses the direction of its movement and begins to move in the direction of the arrow b in Fig. 7, the frictional engagement of the finely corrugated surface of the wiping element 3 with the glass 8 will apply a dragging action to the wiping edge of the wiping element, and the presence of the relatively stiff reenforcing member 7 assists in giving the wiper blade the desired flopping action from the inclined position shown in Fig. 5 to that shown in Fig. 7, for as the wiper arm starts on its journey in the direction of the arrow b, Fig. 7, the wiper blade will roll over the edge 9 of the reenforcing blade 7, which edge provides a fulcrum for the flopping or turning movement of the wiper blade.

It will be recalled that the wiper element 3 is relatively thin and quite flexible, and without the presence of the reenforcing member 7 the portion of the member 3 projecting beyond the holder 1 would not have sufficient stiffness of itself to provide a proper fulcrum for the blade to roll on in flopping from one inclined position to the other. When the wiper blade has completed its flop into the position shown in Fig. 7 and continues the movement in the direction of the arrow b the reenforcing member 7 functions again to hold the thin and quite flexible rubber member 3 against the glass, as shown in Fig. 7. In fact the rubber member 3 may have a flexibility approaching that of fabric and the fine corrugations 4 on the face of the member 3 makes the wiper blade as effective in cleaning the windshield as any fabric would be. The fact that the sheet 3 is quite flexible and the further fact that the U portion of the sheet 3 is quite a little larger than the portion of the reenforcing member 7 that projects beyond the holder so that there is considerable play between the wiping U portion of the sheet and the reenforcing member is advantageous because thereby the wiping element or rubber sheet 3 presents an increased wiping surface in engagement with the glass over what it would have if the sheet fitted the reenforcing member tightly. This is clear from Figs. 5 and 7 wherein it will be observed that by reason of the shape which the U portion of the rubber sheet assumes while it is moving over the glass, a relatively broad zone of contact between the rubber and the glass is provided which increases the wiping or cleaning action of the blade.

The sides 6 of the holder 1 are shown as indented along the lines 10 to more securely retain the wiping element in the holder.

The fine corrugations 4 cover the entire surface of each side of the wiping element so that the portion of the wiping element 2 in Fig. 1 which is enclosed within the U-shaped backing member 1 is also provided with the fine corrugations. This is an advantage because the engagement of the corrugated face of the member 3 with the inside face of the legs 6 of the backing 1 assists in retaining the wiping element in the backing and prevents said wiping element from being pulled out of place.

In Fig. 2 I have shown an embodiment of the invention similar to that shown in Fig. 1 but in which the wiping element is not provided with the relatively fine longitudinal ribs 4. In this embodiment the wiping element is shown at 3—a and is made of a thin sheet of rubber which is folded into the U formation as shown and which encloses the reenforcing strip 7. The exposed or wiping face of the member 3—a may be smooth or may be slightly roughened in any suitable way.

In Fig. 3 I have shown a different embodiment of the invention wherein the two wiping faces of the wiping element are formed on two separate strips 11 and 12, each of relatively thin rubber having the fine corrugations 4 on their wiping faces. This embodiment of the invention also includes the reenforcing member 7 situated between the strips 11 and 12 and which serves to reenforce them, and at the same time form a sufficiently stiff central support to facilitate the flopping action of the blade at each end of its stroke. The construction shown in Fig. 3 differs from that shown in Fig. 1 principally in that the two sides of the wiping element are formed in separate strips instead of being formed from the same strip.

In Fig. 4 there is shown still a different embodiment of the invention wherein the wiping element is composed of a plurality of rubber strips retained in the holder, two of the strips 13 and 14 being of relatively thin rubber and provided at their outer faces with the fine corrugations 4. In this embodiment the wiping members 13 and 14 are separated by one or more other strips of rubber which will preferably have sufficient stiffness to cause the desired flopping action at each end of the stroke of the wiper arm. In Fig. 4 also an additional relatively narrow reenforcing strip 15 is located on the outside of the wiping strips 13 and 14. These reenforcing strips 15 are narrow enough so as to leave a sufficient amount of the corrugated surface of the wiping strips 13 and 14 exposed to perform the cleaning operation on the windshield glass.

In Fig. 10 there is shown a different embodiment of the invention adaptable for a windshield wiper blade that does not have any appreciable flopping action as it reverses its direction of movement at the end of the stroke. In this construction the wiping element is formed of two plies 18 and 19 of thin flexible rubber, each having fine corrugations 4 on its outer face. These two plies are retained in a metal backing or holder 20, and in this embodiment the portion of each strip 18, 19 which is confined within the backing member 20 is provided with corrugations as well as the exposed portion. The presence of the fine corrugations of the portions 5 on the rubber strips 18, 19 adds to the security with which the strips are held within the backing 20.

The relatively thin flexible finely corrugated strips from which the wiping faces 3, 11, 12, 13, 14, 18, and 19 may be formed by passing a quantity of uncured rubber through rolls which roll it out into a thin sheet formation, and before the sheet is cured passing it between two rollers such as rollers 16 and 17 in Fig. 9, one of which rollers is formed with fine peripheral ribs and grooves that produce in the sheet of rubber the fine corrugations 4. After the sheet has thus been formed it may be cured or otherwise treated to render it suitable for use in the wiper blade. Such a thin flexible finely corrugated sheet is to be distinguished from a sheet of rubber with corrugations on it which would be produced by a molding or extruding process, for a molded or extruded strip of rubber would be relatively thick and heavy and would not have the soft flexible quality inherent in applicant's sheet and which is desirable in the wiping element of a windshield wiper.

I claim:

1. A windshield wiper blade comprising a holder U-shaped in cross section, a wiping element formed from a relatively thin flexible sheet of rubber bent into a general U shape and having its edges embraced by the U-shaped holder, a reenforcing strip of material which is relatively stiff and unyielding interposed between the sides of the U-shaped rubber sheet and extending beyond the holder, the U portion of the rubber sheet which is outside of the holder being considerably larger than, and thus loosely enclosing, the portion of the reenforcing strip which projects beyond the holder, said reenforcing strip forming a fulcrum edge on which the blade turns in its flopping movement at each end of the stroke and the looseness of the rubber sheet about the reenforcing strip providing a zone of wiping contact of increased width between the U portion of the rubber sheet and the windshield glass.

2. A windshield wiper blade comprising a holder U-shaped in cross section, a wiping element formed from a relatively thin flexible sheet of rubber bent into a general U shape and having its edges embraced by the U-shaped holder, a reenforcing strip of material which is relatively stiff and unyielding interposed between the sides of the U-shaped rubber sheet and extending beyond the holder, the U portion of the rubber sheet which is outside of the holder being considerably larger than, and thus loosely enclosing, the portion of the reenforcing strip which projects beyond the holder, said reenforcing strip forming a fulcrum edge on which the blade turns in its flopping movement at each end of the stroke and the looseness of the rubber sheet about the reenforcing strip providing a zone of wiping contact of increased width between the U portion of the rubber sheet and the windshield glass, the entire outer surface of the U-shaped member being formed with fine ribs extending longitudinally thereof.

3. A windshield wiper blade comprising a holder U-shaped in cross section and a wiping element comprising a plurality of plies of thin flexible rubber retained in said holder, the entire outer face of each outside ply, including the portion of the face within the holder as well as the portion outside the holder, being provided with fine ribs extending longitudinally of the blade, the presence of the fine ribs on the portion of the outside faces situated within the holder increasing the gripping effect of the holder on the plies.

LOUIS ZAIGER.